(12) United States Patent
Richer et al.

(10) Patent No.: US 7,046,839 B1
(45) Date of Patent: May 16, 2006

(54) TECHNIQUES FOR PHOTOGRAMMETRIC SYSTEMS

(75) Inventors: Yves Richer, St-Hilaire (CA); Miljenko Lucic, Lachine (CA)

(73) Assignee: SPG Hydro International Inc., Sainte Julie (CA)

( * ) Notice: Subject to any disclaimer, the term of this patent is extended or adjusted under 35 U.S.C. 154(b) by 405 days.

(21) Appl. No.: 09/955,295

(22) Filed: Sep. 19, 2001

Related U.S. Application Data

(60) Provisional application No. 60/233,471, filed on Sep. 19, 2000.

(51) Int. Cl.
*G06K 9/00* (2006.01)

(52) U.S. Cl. ...................................... 382/154
(58) Field of Classification Search ................ 382/103, 382/154; 345/418, 419, 441; 356/12; 348/42, 348/50
See application file for complete search history.

(56) References Cited

U.S. PATENT DOCUMENTS

| | | | |
|---|---|---|---|
| 4,802,757 A | 2/1989 | Pleitner et al. | |
| 5,576,547 A * | 11/1996 | Ferreira et al. | 250/369 |
| 5,598,515 A * | 1/1997 | Shashua | 345/422 |
| 5,988,862 A | 11/1999 | Kacyra et al. | |
| 6,175,647 B1 | 1/2001 | Schick et al. | |
| 6,278,460 B1 | 8/2001 | Myers et al. | |

FOREIGN PATENT DOCUMENTS

| | | |
|---|---|---|
| WO | WO 98/08053 | 8/1997 |
| WO | WO 99/15945 | 4/1999 |
| WO | WO 01/01075 | 1/2001 |

OTHER PUBLICATIONS

Morin, et al., Integrated imagery management system, IEEE 1994, pp. II-143 through II-149.*

* cited by examiner

*Primary Examiner*—Vikkram Bali
(74) *Attorney, Agent, or Firm*—Ogilvy Renault LLP

(57) ABSTRACT

Three techniques applicable to photogrammetric systems are taught. The first one is for performing camera position approximation, wherein an image is taken and using this image, it is possible to approximate the position the camera was in when taking the picture. The second technique is for reconstructing planar objects using one image with the planar object present in the image. The third technique is a precision estimation method of reconstructed points. The system performs for each points of interest a simulation of the physical process of image capture, calibration, and reconstruction. The simulation is based on the given tolerances for the system parameters.

3 Claims, 2 Drawing Sheets

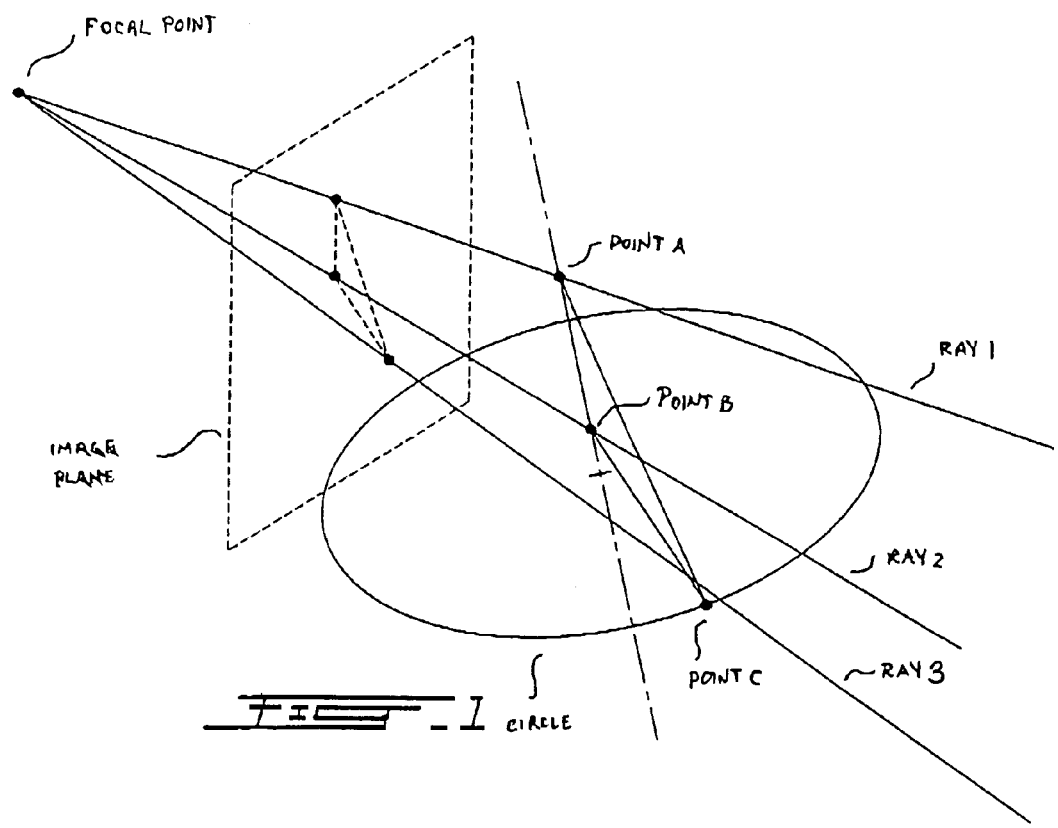

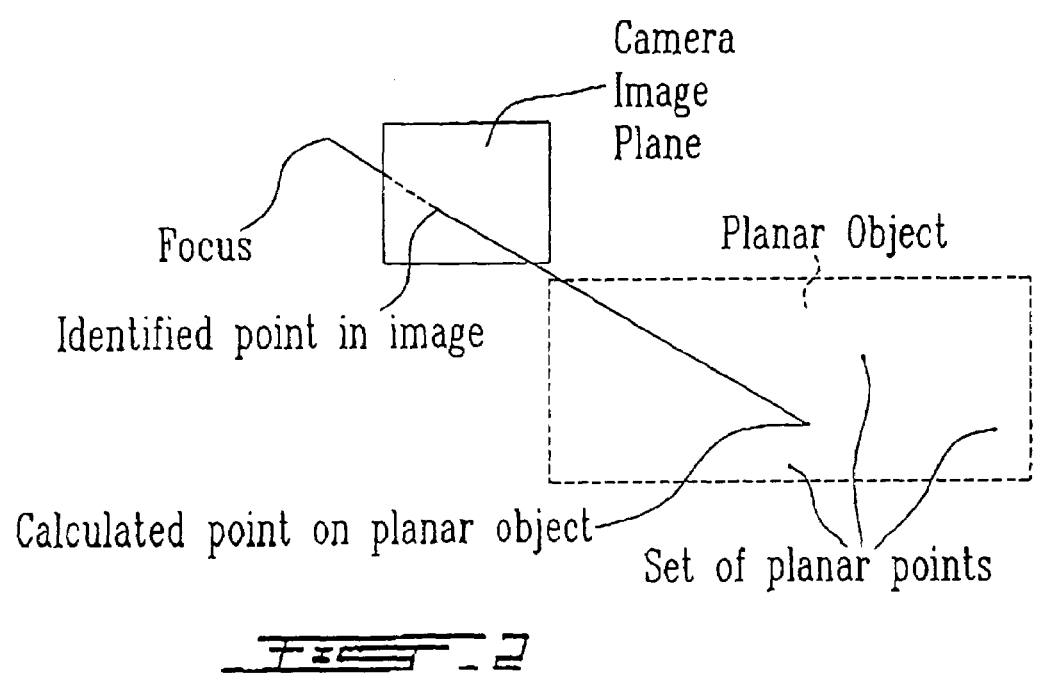

TECHNIQUES FOR PHOTOGRAMMETRIC SYSTEMS

CROSS-REFERENCE TO RELATED APPLICATIONS

The application claims priority of U.S. provisional application 60/233,471, filed Sep. 19, 2000 and entitled "A New General Purpose Photogrammetric 3D Measure System".

FIELD OF THE INVENTION

The present invention relates to the measurement of any visible objects by measurement of points or similar structures. More particularly it relates to a method and apparatus for the measurement of 3D coordinates of points by analyzing images of same.

BACKGROUND OF THE INVENTION

3D Measurements are well known in the art and are widely used in the industry. The purpose is establishing the 3 coordinates of any desired point with respect to a reference point and coordinate system. As known in the prior art, these measurements can be accomplished with coordinate measuring machines (CMMs), teodolites, photogrammetry, laser triangulation methods, interferometry, and other contact and non-contact measurements. However all tend to be complex and expensive to implement in an industrial setting.

U.S. Pat. No. 4,431,290: "Portable photogrammetry system", issued Feb. 14, 1984, provides a short-range hand-held photogrammetry system consisting of two cameras in rigidly fixed positions at the remote ends if a hollow bar. The system provides for simultaneous image capture.

A number of useful methods also exist as exemplified by U.S. Pat. No. 4,802,757: "System for determining the attitude of an airborne platform or the alike", issued Feb. 7, 1989. That patent describes a system that employs digital image grayscale correlation in order to relatively position the moving image sensor at the times of the successive image captures.

However, applications of these systems and methods tend to be limited. Some are physically too large to be moved and easily applied, others require a lot of human intervention. Most require a relatively long data acquisition time where an object has to stand still. Furthermore, they are optimized for a specific object size. Thus, what is needed is a flexible, easily implemented system that can measure in a wide variety of industrial settings. A system performing measurements at sites radically varying by size and complexity, for example measurements in the construction industry as well as in continuous manufacturing processes, is needed.

SUMMARY OF THE INVENTION

Accordingly, an object of the present invention is to provide a widely applicable and efficient techniques for systems based on photogrammetric principles, which can measure three-dimensional coordinates.

It is another object of the present invention for the techniques to apply to either stationary or hand-held cameras. The techniques can use different means of image acquisition, such as photo camera, video camera, and x-ray, and the described methods are equally applicable to all modalities of image capture.

According to a first broad aspect of the present invention, there is provided a method for performing camera position approximation. A method is taught for finding the position pf an object in front of a camera. The starting point is an image taken by the camera in question for which the position is unknown. Three points are selected on the image and are projected into an image space by Intersecting them with the known focal point from the image. The relationship between these three points is known. A first point, point A, is selected arbitrarily on a first of the three rays produced. Point A is preferably selected close to the image plane. A second point, point: B, is found on a second of the three rays by respecting the known distance between two of the points selected on the image plane. In order to determine the location of point C, a circle is drawn, its axis on a path AB land its radius such that known distance AC and BC are respected. Point C is then identified as the point on the circle that is closest to the third ray, wherein point A, point B, and point C define the device position and define its x, y, z coordinates; and wherein orientation angles $\Omega$, $\Phi$, and $\kappa$ can be calculated from the x, v, z coordinates of the points A, B, C. thereby defining the camera position.

Preferably, the process is repeated by choosing different positions for point A in order to find the point C closest to the third ray.

According to a second broad aspect of the present invention, there is provided a method for reconstructing planar objects wherein the planar objects are captured in a plurality of two-dimensional images taken from different angles. The method comprises reconstructing a set of points in an image plane in three dimensions using standard photogrammetric techniques. The set of points should contain at least three points. A three-dimensional position for a selected point must then be calculated on the planar object by identifying the point on one of the two-dimensional images. The actual calculation comprises intersecting a ray that passes from a focal point of a camera through the selected point on the image plane and a plane that is calculated to fit well with the set of points.

According to a third broad aspect of the present invention, there is provided a method for precision estimation of a measured three-dimensional coordinate based on Monte-Carlo simulation. The first step is to choose a three-dimensional point in an imaged space and calculate the point's theoretical position in the image planes. This point becomes a simulation point. Reference points are then chosen in the image planes and their positions are calculated. Tolerances for internal and external parameters of the system (or camera) are then acquired from a system database. A suitable amount of error to positions and parameters are then added to the simulation, the error being determined according to the acquired tolerances. The simulation point is then reconstructed based on its position in images obtained through the simulation and a three-dimensional coordinate is produced. The last step is to compare the original three-dimensional point with the three-dimensional coordinate that was produced by the reconstruction to obtain a precision estimation. Repeating the precision estimation with different amounts of error and averaging out the results can produce a better estimation.

BRIEF DESCRIPTION OF THE DRAWINGS

These and other features, aspects and advantages of the present invention will become better understood with regard to the following description and accompanying drawings wherein:

FIG. 1 is schematic of the camera position approximation process;

FIG. 2 is a schematic of the reconstruction of planar objects process;

DETAILED DESCRIPTION OF THE PREFERRED EMBODIMENT

For the photogrammetric reconstruction of points in three dimensions, two or more photos of a scene are needed. Further, it is necessary to know the camera parameters and position for every photo taken. This requirement is in contradiction with the requirement for flexibility and mobility. Therefore, when camera positions are not known, camera position approximation is applied: along with the measured object, a sufficient number of reference points need to be present in the photos and they are used to find the positions of mobile camera(s) after the images are taken. Note that reference points are only needed if the camera positions and parameters are not already precisely known.

FIG. 1 demonstrates the process of finding the position of an object in front of a camera. The starting point is an image taken by the camera in question for which the position is unknown. Three points are selected on the image and are projected into an image space by intersecting them with the known focal point from the image. The relationship between these three points is known. A first point, point A, is selected arbitrarily on a first of the three rays produced. Point A is preferably selected close to the image plane. A second point, point B, is found on a second of the three rays by respecting the known distance between two of the points selected on the image plane. In order to determine the location of point C, a circle is drawn, its axis on a path AB and its radius such that known distance AC and BC are respected. Point C is then identified as the point on the circle that is closest to the third ray. The process can be repeated by choosing different positions for point A in order to find the point C closest to the third ray. Please refer to Table 1 for the algorithm in pseudo-code.

TABLE 1

Algorithm In Pseudo-Code

```
Program FindCameraPosition(image, referenceElementModel):
ReferencePointsArray =
    = correlation(image, referenceElementModel, reference_point_pattern)
imagePointA = Select3ReferencePointsFromArray(ReferencePointsArray)
imagePointB = Select3ReferencePointsFromArray(ReferencePointsArray)
imagePointC = Select3ReferencePointsFromArray(ReferencePointsArray)
rayA = new Ray(focus, imagePointA)
rayB = new Ray(focus, imagePointB)
rayC = new Ray(focus, imagePointC)
for (all pointA on rayA)
{
    sphereB = new Sphere (radius=d(A,B), center=pointA)
    pointB = cut_path_and_sphere_3D(rayB, SphereB)
    axisAB = new Path( through pointA and pointB)
    circleC = new Circle (radius=d(C,AxisAB), center=projection of C on axisAB)
    error = distance_path_to_circle(rayC, circleC)
        if (detect_local_minimum(error))
        {
            position = find_rot_transl(pointA, pointB, pointC)
            error_all = find_error_for_all_points(all points)
            if (detect_global_minimum(error_all))
                store(position)
        }
}
```

In general, calibration of the camera position and parameters is performed by using known reference points that make part of the scene. First, these points are identified in the photos. Their known positions in the scene (3D) and in the photos (2D) make it possible to first find the approximation of the camera position for every photo. They are also used to adjust the internal camera parameters, which may vary from one photo to another, like the focus and principal point in the compensation phase. Further they are also used to adjust implementation specific parameters of the imaging device such as lens distortion correction parameters. The parameters are the radial, tangential and centering error correction parameters.

The Camera Position Approximation software determines the camera position from information about reference points in each of the images. The reference points can be identified in the image by pattern recognition methods and the system determines the camera position without any operator assistance. If the number of machine recognizable reference points is not sufficient in one or more of the images then the user is required to identify the reference points.

Compensation is the process of calculating the internal camera parameters: the focal length—F, and the principal point offsets—Xpp and Ypp. At the same time the estimated camera positions are fine adjusted. During compensation parameters for all images are optimized in the same process and a common best fit is found.

There are two ways to calibrate a block of photos: either only by calibration of the block of photos (for camera parameters and positions) or by both pre-calibration of the camera and calibration of a block of photos.

Photo block calibration alone: Calibration of a block of photos is performed to obtain the internal camera parameters (Xpp, Ypp, F) and the external parameters (the positions from where the photos were taken—X,Y,Z,K,P,O). Reference points are identified in every photo. A data-fitting algorithm using the maximum likelihood method adjusts the said parameters and positions in order to harmonize the mathematical model with the measured data.

PRE-Calibration and block calibration: Although the information in the block of photos is self sufficient for the calibration to be performed, sometimes it is advantageous to perform the Pre-calibration of the camera to improve further on the precision of the measurement. Pre-calibration of the camera parameters (Xpp, Ypp, F) can only be meaningful if the parameters are not changing. Auto-focus cameras, in general, cannot use pre-calibration. Pre-calibration is performed best with a large number of precise points that are well distributed in the field of view of the camera. A good set of reference points is the "calibration cube". The calculated camera parameters (Xpp, Ypp, F) are permanently stored in the camera properties. These parameters are reused every time that the camera is used. They are considered as very precise.

The pre-calibrated parameters will enter the algorithm of the photo block calibration (camera parameters and position) with a very small standard deviation value. This means the camera parameters will strongly "stick" to the pre-calibrated values during the calibration of a block. At the same time, predominantly the camera position will be adjusted to fit the measured data best.

The "Internal Orientation Start Value" option leaves the choice to the user to choose between the pre-calibrated ("Calibrated per camera") and the approximated value for the internal parameters. The pre-calibrated option will be the default if pre-calibration was performed for the active camera. If so, the proper parameter values that are stored in the project database will be applied. It should be used if the camera has been carefully pre-calibrated and remained untouched since. Otherwise, the "approximated" values for the internal parameters are to be used.

In a second embodiment the camera positions and parameters are fixed and known and no reference elements are needed in the images and the camera position approximation and compensation are not applied.

In the reconstruction phase a point needs to be selected in at least two images taken from different angles in order to be restituted. Any triangulation-based algorithm can be applied to find the points' position in object space based on known camera position parameters and the point's position in multiple images. For point identification, images are displayed side by side. The identification of points in the multiple images can be performed in a number of modalities. In the manual modality the user is able to select any matching points on multiple images by clicking them with the mouse.

In the first automatic modality the system searches for points with a user specified image pattern in user specified areas of the images. Image patterns like points, crosses or circles can be specified as targets for the search algorithm. The system applies a pattern recognition method, like for example the normalized grayscale correlation. For increased precision subpixel methods are applied. These algorithms are precise up to a portion of a picture element—pixel. In the second automatic modality the user points out any object point in any of the images and the system identifies the same object point, if visible, in other images. In any of the modalities, the system allows the user to perform a manual correction of the point positions. Information about the relative orientation between the two images can be used to harmonize the orientation of the left and right image by rotation. This is to facilitate the pattern recognition task.

The algorithm used to reconstruct planar objects begins by reconstructing a set of points in an image plane in three dimensions using standard photogrammetric techniques. The set of points should contain at least three points. A three-dimensional position for a selected point must then be calculated on the planar object by identifying the point on one of the two-dimensional images. The actual calculation comprises intersecting a ray that passes from a focal point of a camera through the selected point on the image plane and a plane that is calculated to fit well with the set of points.

In another embodiment, the system performs a precision estimate of the reconstructed points. The system performs for each of the points of interest a simulation of the physical process of image capture, calibration and reconstruction. The simulation is based on the given tolerances for the system parameters—e.g. reference points.

The method used for precision estimation of a measured three-dimensional coordinate is based on Monte-Carlo simulation. The first step is to choose a three-dimensional point in an imaged space and calculate the point's theoretical position in the image planes. This point becomes a simulation point. Reference points are then chosen in the image planes and their positions are calculated. Tolerances for internal and external parameters of the system (or camera) are then acquired from a system database. A suitable amount of error to positions and parameters are then added to the simulation, the error being determined according to the acquired tolerances. The simulation point is then reconstructed based on its position in images obtained through the simulation and a three-dimensional coordinate is produced. The last step is to compare the original three-dimensional point with the three-dimensional coordinate that was produced by the reconstruction to obtain a precision estimation. Repeating the precision estimation with different amounts of error and averaging out the results can produce a better estimation.

In one variation of the invention, a structured light source is provided to project a multiplicity of target patterns. This is to facilitate the correlation of corresponding points in a multiplicity of captured images.

As the reconstruction phase is done, the system allows the user to perform different tasks of data editing and analyzing such as: modification of the data origin and orientation, re-sampling, comparison with other model, export in different formats etc.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for performing camera position approximation for determining positions of a device used to capture an image, said method based on photogrammetric principles and comprising:
   identifying three points in said image captured by said camera, wherein said three points have a known relationship and said image becomes an image plane;
   projecting said three points' rays into an image space by intersecting each of said three points with a known focal point of said image plane;
   Choosing a point A on a first of said three points' rays at a location near said image plane;
   based on said known relationship, identifying a point B on a second of said three points' rays;
   drawing a circle with its center axis on a path AB and its radius such that known distances between points A and C and points B and C are respected;

choosing a point C on said circle closest to a third of said three points' rays;

repeating said choosing a point A so as to find a closest point C to said a third of said three points' rays;

wherein point A, point B, and point C define said device position and define its x, y, z coordinates; and wherein orientation angles $\Omega$, $\phi$, and $\kappa$ can be calculated from said x, y, z coordinates of said points A, B, C, thereby defining said camera position.

2. A method for performing a precision estimation of a measured three-dimensional coordinate based on Monte-Carlo simulation, said method comprising:

choosing a three-dimensional point in an imaged space and calculating said three-dimensional point's theoretical position in the image planes, whereby said point becomes a simulation point;

calculating reference points' positions in said image planes;

acquiring tolerances for internal parameters and said external parameters from a system database;

adding a suitable amount of error to positions and parameters in said simulation, wherein said error is determined according to said tolerances;

reconstructing said simulation point based on its position in images obtained through simulation, said internal parameters, and said external parameters and producing a three-dimensional coordinate; and comparing said three-dimensional point with said three-dimensional coordinate produced by said reconstruction to obtain said precision estimation.

3. A method as claimed in claim 2, wherein said precision estimation is repeated with different suitable amounts of error, and all results produced are averaged to obtain a better estimation.

* * * * *